United States Patent
Sabne et al.

(10) Patent No.: US 11,068,247 B2
(45) Date of Patent: Jul. 20, 2021

(54) VECTORIZING CONDITIONAL MIN-MAX SEQUENCE REDUCTION LOOPS

(71) Applicant: Microsoft Technology Licensing, LLC, Redmond, WA (US)

(72) Inventors: Amit Sabne, Seattle, WA (US); James J Radigan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 237 days.

(21) Appl. No.: 15/889,480

(22) Filed: Feb. 6, 2018

(65) Prior Publication Data
US 2019/0243625 A1    Aug. 8, 2019

(51) Int. Cl.
*G06F 8/41*    (2018.01)

(52) U.S. Cl.
CPC .............. *G06F 8/443* (2013.01); *G06F 8/427* (2013.01); *G06F 8/4441* (2013.01); *G06F 8/456* (2013.01)

(58) Field of Classification Search
CPC ........ G06F 8/427; G06F 8/443; G06F 8/4441; G06F 8/456
See application file for complete search history.

(56) References Cited

U.S. PATENT DOCUMENTS

| | | | |
|---|---|---|---|
| 7,370,321 B2 | 5/2008 | Radigan | |
| 2002/0144245 A1* | 10/2002 | Lueh | G06F 8/41 |
| | | | 717/140 |
| 2004/0001066 A1* | 1/2004 | Bik | G06F 8/452 |
| | | | 345/505 |
| 2004/0268370 A1 | 12/2004 | Mosier et al. | |
| 2006/0048121 A1* | 3/2006 | Blainey | G06F 8/443 |
| | | | 717/160 |
| 2006/0161908 A1 | 7/2006 | Bearman et al. | |
| 2006/0174227 A1 | 8/2006 | Bearman et al. | |
| 2008/0052688 A1 | 2/2008 | O'Brien et al. | |
| 2010/0325608 A1 | 12/2010 | Radigan | |
| 2012/0079466 A1 | 3/2012 | Gonion | |

(Continued)

OTHER PUBLICATIONS

Aart J. C. Bik et al. "Multimedia vectorization of floating-point min/max reductions," 2006, Concurrency and Computation Practice and Experience, vol. 18, pp. 997-1007. (Year: 2006).*

(Continued)

*Primary Examiner* — S. Sough
*Assistant Examiner* — Stephen D Berman
(74) *Attorney, Agent, or Firm* — Ogilvie Law Firm

(57) ABSTRACT

Algorithms, examples, and related technology for automatic vectorization of a particular class of loops is described. The loops, denoted "CMMSR loops", operate to find an extremum and also utilize an index denoting the position of the extremum in an array or other multi-element input. CMMSR loops are identified in a language translator by matching a specified template or having a specified set of parsing results, or both. Generated vectorization code includes, for example, code to compute candidates for the extremum, code to select the same instance of the extremum as a scalar execution when the input contains multiple instances, and wind-down code to compute an index expression based on the selected instance of the extremum. Vectorizations may execute on SIMD hardware or other vector processors.

20 Claims, 5 Drawing Sheets

(56) References Cited

U.S. PATENT DOCUMENTS

| | | | |
|---|---|---|---|
| 2013/0117548 A1 | 5/2013 | Grover et al. | |
| 2013/0346058 A1* | 12/2013 | Beckmann | G06F 9/4552 703/22 |
| 2014/0122832 A1 | 5/2014 | Ngai et al. | |
| 2014/0129783 A1 | 5/2014 | Marathe et al. | |
| 2014/0129812 A1 | 5/2014 | Chakrabarti et al. | |
| 2014/0130021 A1 | 5/2014 | Lin et al. | |
| 2014/0130052 A1 | 5/2014 | Lin et al. | |
| 2014/0237460 A1 | 8/2014 | Schmidt | |
| 2015/0268940 A1* | 9/2015 | Baghsorkhi | G06F 8/452 717/160 |
| 2016/0092183 A1 | 3/2016 | Radigan | |
| 2016/0321045 A1 | 11/2016 | Radigan et al. | |
| 2017/0286076 A1 | 10/2017 | De et al. | |
| 2019/0258489 A1* | 8/2019 | Horsnell | G06F 9/30036 |

OTHER PUBLICATIONS

"What exactly PHI instruction does and how to use it in LLVM", retrieved from <<https://stackoverflow.com/questions/11485531/what-exactly-phi-instruction-does-and-how-to-use-it-in-llvm/11485946>>, Dec. 1, 2015, 3 pages.

"List of CIL instructions", retrieved from <<https://en.wikipedia.org/wiki/List_of_CIL_instructions<<, Sep. 23, 2017, 15 pages.

How to Write Fast Code: SIMD Vectorization, retrieved from <<https://users.ece.cmu.edu/~franzf/teaching/slides-18-645-simd.pdf>>, Spring 2008, 37 pages.

"LLVM Project Blog: LLVM 3.3 Vectorization Improvements", retrieved from <<http://blog.llvm.org/2013/05/llvm-33-vectorization-improvements.html>>, May 28, 2013, 6 pages.

"LLVM Project Blog: New Loop Vectorizer", retrieved from <<http://blog.llvm.org/2012/12/new-loop-vectorizer.html>>, Dec. 7, 2012, 6 pages.

"Auto-vectorization in GCC", retrieved from <<https://gcc.gnu.org/projects/tree-ssa/vectorization.html>>, Oct. 23, 2011, 24 pages.

"Intermediate representation", retrieved from <<https://en.wikipedia.org/wiki/Intermediate_representation>>, Nov. 14, 2017, 4 pages.

"Reduction Variables—Matlab & Simulink", retrieved from >>https://www.mathworks.com/help/distcomp/reduction-variable.html?s_tid=gn_loc_drop>>, no later than Jan. 26, 2018, 6 pages.

"Streaming SIMD Extensions", retrieved from >>https://en.wikipedia.org/wiki/Streaming_SIMD_Extensions>>, Dec. 23, 2017, 6 pages.

Saeed Maleki, et al., "An Evaluation of Vectorizing Compilers", 2011 International Conference on Parallel Architectures and Compilation Techniques (PACT), Oct. 2011, 11 pages.

"631.deepsjeng_s SPEC CPU2017 Benchmark Description", retrieved from <<https://www.spec.org/cpu2017/Docs/benchmarks/631.deepsjeng_s.html >>, 2017, 3 pages.

"SPEC CPU2006 Results", retrieved from <<https://www.spec.org/cpu2006/results/>>, 2006, 2 pages.

"What is reduction variable? Could anyone give me some examples?", retrieved from <<https://stackoverflow.com/ questions/14955912/what-is-reduction-variable-could-anyone-give-me-some-examples>>, Feb. 19, 2013, 1 page.

"Dominator (graph theory)", retrieved from <<https://en.wikipedia.org/wiki/Dominator_(graph_theory)>>, Jan. 3, 2017, 4 pages.

"Automatic vectorization", retrieved from <<https://en.wikipedia.org/wiki/Automatic_vectorization>>, Aug. 22, 2017, 8 pages.

"Compiler", retrieved from <<https://en.wikipedia.org/wiki/Compiler>>, Jan. 29, 2018, 10 pages.

Martyn Carden, "Requirements for Vectorizable Loops", retrieved from <<https://software.intel.com/en-us/articles/requirements-for-vectorizable-loops>>, Aug. 2, 2012, 6 pages.

\* cited by examiner

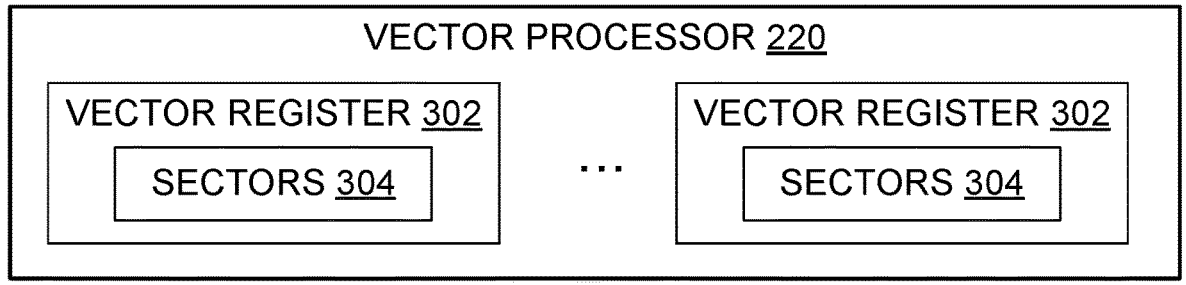
Fig. 3
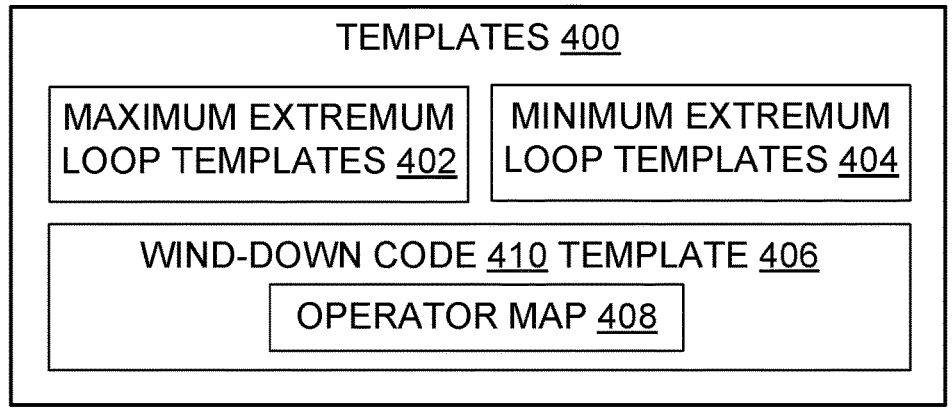
Fig. 4
|  | CHANNEL 504 | CHANNEL 504 | CHANNEL 504 | CHANNEL 504 |
|---|---|---|---|---|
| LANE 502 | 0 | 1 | 4 | 7 |
| LANE 502 | 7 | 1 | 2 | 3 |
| RESULT 506 | 7 | 1 | 4 | 7 |
Fig. 5

AN EXAMPLE OF CMMSR LOOP CHARACTERISTICS 210

```
1    for (i = 0; i < num_moves; i++) {
2        if (move_ordering[i] > best) {
3            best = move_ordering[i];
4            test = i;
5        }
6    }
```

A loop 204 is the code in lines 1-6 above.
A loop index 600 is "i".
A loop condition 602 is "i < num_moves".
A loop body 604 is the code in lines 2-5.
An extremum test 606 is "(move_ordering[i] > best)".
An extremum value 608 is a value of "move_ordering[i]" for some i.
An extremum value assignment 610 is "best = move_ordering[i];".
An extremum variable 612 is "best".
An extremum index assignment 614 is "test = i;".
An index expression 616 is "i".
An extremum index variable 618 is "test".
An original operator 620 is greater-than ">" in line 2.
A conditional statement 622 is the if statement with a scope 624 covering lines 2-5.
A lower bound 626 of the loop condition is 0 in line 1.
An upper bound 628 of the loop condition is num_moves in line 1.
A multi-element variable 630 is the array move_ordering[].

Fig. 6

VECTORIZING CONDITIONAL MIN-MAX SEQUENCE REDUCTION LOOPS

BACKGROUND

Computer software may be optimized with respect to several different criteria. For example, some optimizations decrease the size of executable code, some reduce the amount of working memory that is used as the software executes, some make the software execute faster, some reduce the software's vulnerability to malicious attacks, and so on. Often there are technical tradeoffs, e.g., an optimization that increases the amount of working memory used by software may also permit that software to execute in a shorter time.

Sometimes an optimization to a software program is most effectively performed by a developer, which is a person who writes software. A developer may also be referred to as a software programmer or software engineer. High-level optimizations of a program are often beyond the capabilities of automation, so they can be done well (and sometimes even done at all) only by a person. For example, it may be possible to speed up a given program by rewriting it to replace one search algorithm by another search algorithm which uses different data structures, but the extensive changes in the program in question which embody the switch in search algorithms can be accomplished only by a knowledgeable developer.

In other situations, an optimization might be within the reach of automation. For example, many compilers have been developed that identify situations in which overhead from making a function call can be avoided by placing the body of the function inline and omitting executable code to perform the call and the return from the call.

Indeed, some optimizations are most effectively done by automation. Those of skill in various software arts also recognize that as a practical matter some optimizations can only be correctly and efficiently done if they are done by automation. Compiling source code for commercial software is not effectively done by hand; that is why compilers were created. In particular, some software optimizations are performed, if at all, only by a compiler. Relying on developers to manually perform all optimizations would result in source code which is harder for people to read and understand than would otherwise be the case. Errors and omissions would also be frequent, because many optimizations use complex data and structures such as dependency graphs, intermediate representations, abstract syntax trees, and the like, which can be efficiently built and modified and used by a compiler but not by hand.

Accordingly, technical improvements in the performance of software can be achieved by identifying optimizations and implementing them in compilers.

SUMMARY

All of the technologies presented herein relate to parallelization optimizations of software, and in particular relate to automatic vectorization by compilers or interpreters.

Some technologies described herein are directed to technical activities performed by a compiler or interpreter to recognize source code loops that fit a particular loop pattern which has not previously been considered vectorizable; such a loop is denoted here a "conditional min-max sequence reduction loop" ("CMMSR loop"). CMMSR loops involve code to find an extremum—a minimum or a maximum—among the values of a multi-element input such as an array, tuple, concatenation, or list. CMMSR loops also involve code to track which index of the multi-element input corresponds to the extremum. "Index" is used here to mean a relative position in a multi-element input, and thus is not limited to an array index but may also refer in a particular case to a position in a list, an offset into a block of concatenated individual values, or a position in a tuple, for example.

Some of the examples provided herein are directed to CMMSR loop vectorization tools or techniques which provide translations of CMMSR loops, and in particular, provide translations which are at least partially vectorized. One says "at least partially vectorized" because the number of elements in the multi-element input need not be an exact multiple of the number of vector processor sectors, for example. When the number of iterations of a CMMSR loop is an exact multiple of the number of elements that can be processed in parallel at a time, the translation of the loop can be fully vectorized. In other cases, there is an iterations remainder, and only a part of the iterations traversing the individual elements is vectorized. Note also that if the results of a CMMSR loop execution are not used, then the loop can be removed entirely, but that is a trivial special case. The situations of interest here include those in which CMMSR loop execution results matter outside the loop, so the vectorized translation will be non-empty.

Other technical activities pertinent to teachings herein will also become apparent to those of skill in the art.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 3 is a block diagram illustrating aspects of a vector processor capable of executing a loop vectorization;

FIG. 4 is a block diagram illustrating aspects of templates which define characteristics of some vectorizable loops and a wind-down portion of some vectorizations;

FIG. 5 is a diagram illustrating vector lanes and other aspects of an example execution of a loop vectorization;

FIG. 6 includes a source code listing of an illustrative conditional min-max sequence reduction loop, together with text calling out particular labeled characteristics and other aspects of the example loop;

DETAILED DESCRIPTION

An Overview of Loop Vectorization

Figure 1:
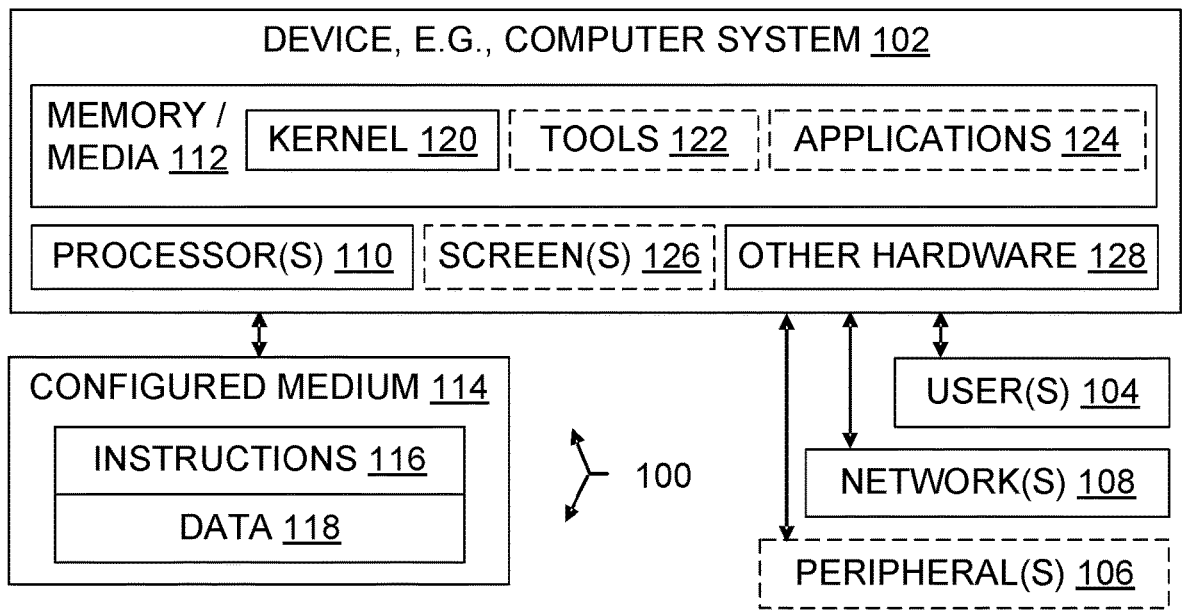
FIG. 1 is a block diagram illustrating a computer system having at least one processor, at least one kernel, and at least one digital memory, which interact with one another, and also illustrating a configured storage medium.

Automatic vectorization is a powerful technique to improve software performance. Automatic vectorization is an example of automatic parallelization which occurs when software is automatically converted from a scalar implementation to a vector implementation. A scalar implementation processes a single pair of operands at a time, whereas a vector implementation processes multiple pairs of operands at once. Many computers have hardware which supports vector operations that simultaneously operate on multiple operands. Examples of such hardware include single-instruction-multiple-data (SIMD) hardware and single-program-multiple-data (SPMD) hardware.

Vectorization does not always decrease execution time. However, it does decrease execution time in many cases. Automatic vectorization of loops in particular may substantially decrease execution time, without manual effort from programmers, because many programs spend significant amounts of time inside loops. For instance, many programs include loops that sequentially perform additions of corresponding entries in arrays. Here is an example of such a loop, written in the C programming language, which adds corresponding entries of an array a and an array b, and places the sums in corresponding locations of an array c:

```
for (i = 0; i < n; i++) {
    c[i] = a[i] + b[i];
}
```

A non-vectorized (i.e., scalar) implementation of this loop performs the operations in sequence, one after another, by first performing c[0]=a[0]+b[0] and then performing c[1]=a[1]+b[1] and then performing c[2]=a[2]+b[2], and so on up to and including c[n−1]=a[n−1]+b[n−1].

Instead of performing these operations one at a time, a vectorized implementation performs N of them at once. For instance, if N is 4, then the first vectorized operation would simultaneously perform all four of the following individual operations:

$c[0]=a[0]+b[0]$ $c[1]=a[1]+b[1]$ $c[2]=a[2]+b[2]$ $c[3]=a[3]+b[3]$

Then, if n was at least 8, the next four individual operations would be performed simultaneously, and so on.

Not every loop is vectorizable. To be vectorizable, legality requirements that are enforced in a given implementation must not be violated. Some of these legality requirements involve data dependencies that occur when a value created in one iteration of a loop can be needed during the execution of another iteration of the loop. For example, loops which have backward loop-carried data dependencies may be considered non-vectorizable. Such data dependencies occur when a value might be needed inside the loop before it has been computed inside the loop, e.g., the value a[i−1] in the following loop:

```
for (i = 1; i < MAX; i++) {
    d[i] = e[i] − a[i−1];
    a[i] = b[i] + c[i];
}
```

Sometimes loops are considered non-vectorizable for specific reasons, such as data dependencies, which can be shown to cause the vectorization to produce different computational results than a scalar implementation. However, sometimes loops are not vectorized simply because algorithms for vectorizing them have not been devised, or at least not been published.

Vectorization algorithms are required in order to perform vectorization automatically. Automatic vectorization has the advantage of requiring little or no effort from programmers and avoiding the introduction of errors from manual attempts to code vector operations. A vectorizing compiler automatically transforms vectorizable loops that it recognizes and considers legal into sequences of vector operations. Vector operations can substantially improve the operation of a computing system. In the vectorization example above, vector operations perform additions on length-four (N=4 in the example) blocks of elements from the arrays a and b and places the results in length-four blocks of array c, leading to an approximate four-fold increase in loop execution speed.

An Introduction to an Innovation

The present document describes a methodology to automatically vectorize a new class of loops (new in the sense that these loops were previously treated as non-vectorizable). The new class of loops are called herein "conditional min-max sequence reduction" loops (CMMSR loops). This compiler-implementable approach to automatically vectorize a new class of loops extends and enhances automatic vectorization, a compiler technology that speeds up program execution by exploiting SIMD units available on the modern CPUs, for example. These SIMD units use vector registers, which have channels that can be used and updated in parallel. For example, a 128-bit vector register may be configured with four 32-bit channels; each channel can hold a 32-bit integer value and the four integer values can be operated on in parallel. When the loop iterations are not data-independent, loops cannot be vectorized. One of the common scenarios where a data dependence can be eliminated is termed "reductions". Some reduction examples now available for vectorization include cases in which (i) each iteration of a loop adds a value to the same memory location across all iterations, and (ii) the maximum number in a given array is found.

Consider the following code which is now vectorizable according to teachings provided herein, and the CMMSR pattern this code illustrates:

```
1  int test = −1;
2  int best = −1;
3  for (i = 0; i < num_moves; i++) {
4      if (move_ordering[i] > best) {
5          best = move_ordering[i];
6          test = i*i;
7      }
8  }
9  x = test; // could be any use of test; removing the loop is not possible
10 y = best; // could be any use of best; removing the loop is not possible
```

One of skill understands that the particular identifier names used here are not the point; different identifiers than "best" and "test" and "i" and so on can be used without departing from the CMMSR pattern. The code in this example assigns best the largest value in the array move_ordering[ ], and assigns test the square of the index corresponding to the first instance of that largest value encountered as the array is traversed from move_ordering[0] to move_ordering[num_moves−1]. As for the pattern, the assignment at line 6 is one of many different assignments of an expression that depends on the loop index i. Other vectorizable loops that fit the pattern for a CMMSR loop assign the value of different expressions that depend on the loop index i, seek a minimum instead of a maximum, traverse the loop from high index to low index instead of low index to high index, reverse the order of assignments to an extremum variable (best in line 5) and an extremum index variable (test in line 6), add other statements inside the conditional that spans lines 4-7, add one or more statements between lines 3 and 4 or between lines 7 and 8 or in both locations that do not access any variable that is used inside the if statement, or do a combination of such things, without departing from the CMMSR loop pattern and vectorization as taught herein.

Some embodiments described herein may be viewed in a broader context. For instance, concepts such as finding extrema, using indexes, vectorization, parsing, and translation may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving finding extrema, using indexes, vectorization, parsing, or translation are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the computing arts, particularly in arts pertaining to source code translation and compiler implementation, and the technical character will also be apparent in several ways to a wide range of attentive readers. Some embodiments address technical activities that are rooted in computing technology, such as parsing source code, vectorizing loops, and generating executable code. Some technical activities described herein support cleaner software design by expanding the loop vectorization capabilities of a compiler, thereby making it unnecessary to attempt vectorization kludges in source code.

Some embodiments include technical components such as computing hardware which interacts with software in a manner beyond the typical interactions within a general purpose computer. For example, in addition to normal sequential interactions, some embodiments described herein implement automatic vectorizations for specific SIMD or other parallel processors.

Technical effects provided by some embodiments include more efficient use of vector processors, and also include faster code execution in circumstances where vectorization speeds execution.

Some embodiments disclosed herein include technical adaptations such as CMMSR loop identification based on parsing results, additional extremum loop templates beyond those previously known, a wind-down code template utilizing operator mapping, different handling for simple and non-simple expressions in an extremum index assignment, and vectorized translations of CMMSR loops.

Other advantages based on the technical characteristics of the teachings will also be apparent to one of skill from the description provided.

Acronyms and Abbreviations

Some acronyms and abbreviations are defined below. Others may be defined elsewhere herein or require no definition to be understood by one of skill.

API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
OS: operating system
RAM: random access memory
ROM: read only memory Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

"Programming language translator" (a.k.a. "translator") means a compiler, an interpreter, or another software program which translates computer programming language input into one or more of the following: an abstract syntax tree, assembly language, binary code, a different programming language, executable code, hardware description language, intermediate code, machine instructions, object code, p-code, or register transfer language.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim. Similarly, "method" is used herein at times as a technical term in the computing science arts (a kind of code routine) and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although their performance may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. An operation such as parsing a source code or translating source code to internal data structures during compilation is understood herein as requiring and providing speed and accuracy and complexity management that are not obtainable by human mental steps, in addition to the inherently digital nature of such operations (e.g., a human mind cannot interface directly with RAM or other digital storage to search a parsing result or generate intermediate representation code). This is understood by persons of skill in the art, but others may sometimes need to be informed or reminded of the facts.

"Computationally" likewise means a computing device (processor plus digital memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adjusting, assigning, calculating, checking, determining, expanding, finding, generating, identifying, inserting, inspecting, iterating, mapping, matching, meeting, obtaining, operating, parsing, performing, placing, processing, producing, providing, receiving, recognizing, running, splitting, testing, translating, treating, using, vectorizing (and adjusts, adjusted, assigns, assigned, etc.) with regard to a destination or other subject may involve intervening action such as calling, forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium or digital storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, digital storage media including computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

List Of Reference Numerals

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally
110 processor (scalar or vector, depending on context)
112 computer-readable storage medium, e.g., RAM, hard disks
114 removable configured computer-readable storage medium
116 instructions executable with processor; may be on removable media or in other memory (volatile or non-volatile or both)
118 data
120 kernel(s), e.g., operating system(s), BIOS, device drivers
122 tools, e.g., source code editors, compilers and other programming language translators, integrated development environments, operating system utilities, antivirus software, network administration software
124 applications, e.g., word processors, web browsers, spreadsheets
126 display screens
128 computing hardware not otherwise associated with a reference number 106, 108, 110, 112, 114
202 source code
204 CMMSR loop, namely, a loop matching a CMMSR template or a loop having the CMMSR characteristics recited in a given claim or other context, or both matching a CMMSR template and having the recited characteristics
206 parser, e.g., compiler front end code which performs semantic analysis
208 parse results (typically internal to compiler, produced by parser)
210 characteristics of a CMMSR loop
212 translator, e.g., compiler or interpreter or pertinent portion thereof; also referred to as the "vectorizer"
214 vectorized translation of a loop, or a portion thereof which includes vector operations; also referred to as the "vectorization"

216 compiler (may be ahead-of-time AOT or just-in-time JIT)
218 interpreter
220 SIMD or other vector processor; is an example of a processor 110
222 element of a multi-element data item, e.g., element of an array, list, block of concatenated values in memory, tuple; may also refer to the entire array or other item, depending on context
224 input to a loop; inputs of primary interest herein are arrays and other multi-element data items 222
302 vector register, namely, a register in a vector processor
304 vector register sector; a vector register includes at least two sectors which can each hold data that is processed in parallel with data of at least one other sector; sectors are sometimes called "channels" but one can also view a channel as a given sector considered over the course of multiple loop iterations
400 vectorization templates
402 vectorization templates in which a maximum is pursued in a loop as an extremum
404 vectorization templates in which a minimum is pursued in a loop as an extremum
406 template for wind-down code in a vectorization of a loop
408 operator mapping in wind-down code, namely, a mapping between an operator used in the source code of a loop to find an extremum and an operator used in wind-down code in a vectorization of the loop
410 wind-down code in a vectorization of a loop, namely, code which gathers candidates across vector sectors when computing an extremum or an index corresponding to an extremum or both
502 vector lane, namely, storage which contains values in multiple sectors of a vector register or vector processor at a given point in time
504 vector channel, namely, storage which contains values in a given sector of a vector register or vector processor at two or more different points in time
506 result vector lane, namely, storage which contains values selected from multiple vector sectors at one or more different points in time
600 loop index
602 loop condition
604 loop body
606 extremum test
608 extremum value
610 extremum value assignment
612 extremum variable
614 extremum index assignment
616 index expression, namely expression based at least in part on index
618 extremum index variable
620 original operator in extremum test
622 conditional statement based on extremum test
624 scope of conditional statement 622
626 lower bound of loop condition
628 upper bound of loop condition
630 multi-element variable, e.g., array, tuple, list, or concatenation
700 loop vectorization method
702 receive source code containing loop
704 inspect loop parsing result to check whether loop is CMMSR loop
706 process loop as non-CMMSR loop; this may result in no vectorization or in vectorization using conventional methods, depending on the particular source code and on the capabilities and configuration of the particular translator that is processing the source code
708 determination made that loop is a legal CMMSR loop
710 produce vectorized translation of legal CMMSR loop
712 execute vectorized translation of legal CMMSR loop to process a multi-element variable input which contains multiple instances of an extremum value, e.g., two or more instances of a minimum value when searching for a minimum or two or more instances of a maximum value when searching for a maximum
714 obtain from execution 712 the same extremum index as would be or is obtained from executing a scalar translation of the legal CMMSR loop
716 extremum index, namely, value of extremum index variable that corresponds to location of the extremum in the multi-element variable input
718 scalar translation of CMMSR loop
800 flowchart of steps which relate to automatic vectorization
802 vectorize a loop
804 parse source code, especially, loop source code
806 use results of source code parsing, e.g., to determine whether a loop is a CMMSR loop
808 determine that loop is a CMMSR loop, because it matches a CMMSR loop template or has specified CMMSR loop characteristics or both
810 match loop to CMMSR loop template
812 check whether loop meets vectorization legality requirements
814 vectorization legality requirements, e.g., no dependence between multi-element input variable values across loop iterations that are separated by more than the number of sectors in the vector processor
816 operate CMMSR loop vectorization translator within a compiler or an interpreter; unless clearly stated otherwise, the translator 212 is a portion of a compiler or a portion of an interpreter as opposed to being an entire compiler or an entire interpreter
818 place one or more candidate values in a vector lane
820 candidate value which is an intermediate result in computation of an extremum or an extremum's index; may also be the final result of that computation
822 scalar expand a variable across sectors of a vector lane
824 find a minimum index across a vector lane
826 calculate an iteration remainder, e.g., perform division of number of sectors per vector lane into number of loop iterations and get remainder
828 iteration remainder, namely, number of loop iterations left after performing iterations that each use all sectors of a vector processor; if a vector register has four sectors, for example, and a loop has eight iterations, then the iteration remainder is zero, but if there were ten iterations then the remainder would be two, and so on
830 adjust loop boundaries to split iterations into a piece that has an even multiple of the number of sectors in the vector processor and a piece that has the iteration remainder number of iterations
832 split iterations of a loop into a piece that has an even multiple of the number of sectors in the vector processor and a piece that has the iteration remainder number of iterations, e.g., if a vector register has four sectors and the loop has eleven iterations, split the loop into pieces which include one loop with iterations one through eight and another loop with iterations nine through eleven; then the first piece will be vectorized and the second piece will not be vectorized (alternately, in some implementations the loop will be padded out to an even multiple of the number of sectors with dummy value(s) that do not affect the extremum calculation, and then vectorized)

834 iterations of a loop 836 treat an index as a candidate for primary reduction 838 produce wind-down code of a vectorization 840 insert a basic assignment of an index into the source code or into a translation of the source code 842 basic assignment of an index, namely, an assignment of the form <variable gets index> (e.g., "test=i" in FIG. 6 at line 4) as opposed to an assignment of the form <variable gets expression involving index and more> (e.g., "test=i*i" or "foo=i++" or "mys=int(sqrt(i))" etc.)

844 generate translation; may also be stated as "generate vectorization" with the understanding that a translation may include more than the vectorization per se 846 identify a CMMSR loop in a source code, e.g., by matching 810 a CMMSR loop template or determining 808 that CMMSR loop characteristics are present 848 provide (e.g., allocate) a portion of memory 112

850 non-vectorized portion of source code translation

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated. A GUI may include integrated NUI or voice command functionality, for example. A GUI may be generated on a local desktop computer, or on a smart phone, for example, or it may be generated from a web server and sent to a client device 102. Natural user interface (NUI) operation may use peripherals 106 or other hardware 128 for speech recognition, touch and stylus recognition, gesture recognition both on screen and adjacent to the screen, air gestures, head and eye tracking, voice and speech, vision, touch, gestures, and/or machine intelligence, for example.

System administrators, network administrators, software developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more digital storage such as computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other digital memory storage devices which are not readily removable by users 104. For compliance with current United States patent requirements, neither a computer-readable medium nor a computer-readable storage medium nor a computer-readable memory nor any other digital storage medium is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items. Such data is also transformable by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., vector processors, CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and digital memory. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Systems

Examples are provided herein to help illustrate aspects of the technology, but the examples given within this document do not describe all of the possible embodiments. Embodiments are not limited to the specific hardware, implementations, arrangements, displays, features, approaches, or scenarios provided herein. A given embodiment may include additional or different technical features, mechanisms, sequences, or data structures, for instance, and may otherwise depart from the examples provided herein.

Figure 2:
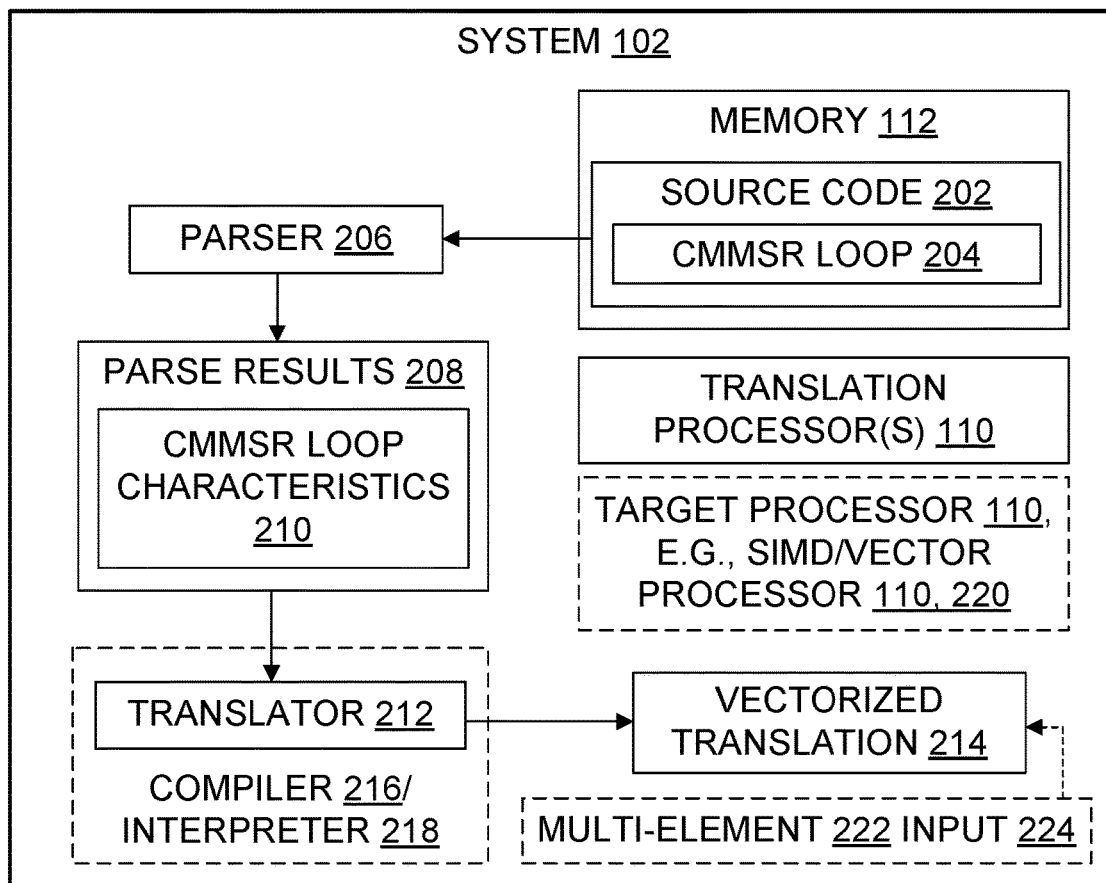
FIG. 2 is a block flow diagram illustrating aspects of a system having a translator which recognizes and vectorizes conditional min-max sequence reduction loops.

With reference to FIG. 2, an example system 102 includes a digital memory 112 and one or more processors 110. Since system 102 is a source code translation system but is not necessarily also the target system upon which the translation will run, system 102 includes at least one translation processor to perform the translation process but does not necessarily include a target processor. The translation processor and the target processor may be the same processor or different processors, depending on the particular embodiment. The target processor is a vector processor 220, such as a SIMD processor for example. The translation processor may be a vector processor 220, but is not required to be a vector processor.

A source code 202 containing at least one CMMSR loop 204 resides in the memory. A parser 206 also resides in the memory as software and is executed by the translation processor, or the parser may be implemented as special-purpose hardware. The parser uses familiar tools of compiler front-ends, for instance, to create parsing results 208 such as a syntax tree. However, the parser 206 is adapted to recognize CMMSR characteristics 210. For instance, a conventional parser would not necessarily provide results that distinguish between a conditional statement test generally and a conditional statement test which operates as an extremum test, but the parser results 208 make that distinction available to a translator 212 which produces a vectorized translation 214 as taught herein. The translator 212 runs in the system 102 as part of a compiler 216 or an interpreter 218. The vectorized translation, upon execution by the target processor, takes values of a multi-element variable 222 as an input 224, and produces outputs such as an extremum (i.e., minimum or maximum) and an index indicating the position of the extremum in the multi-element variable.

More generally, some embodiments use or provide a source code translation system 102 including at least one processor 110, a digital memory 112 in operable communication with the processor, and a translator 212. The translator resides in the digital memory, or may be implemented as special-purpose hardware. Upon execution by the processor or special-purpose hardware, the translator 212 performs a source code translation process that includes identifying a conditional min-max sequence reduction loop ("CMMSR loop") 204 in a source code 202 and producing a non-empty at least partially vectorized translation 214 of the CMMSR loop.

In some embodiments, the translator 212 operates 816 within at least one of the following: an ahead-of-time compiler 216, a just-in-time compiler 216, or an interpreter 218.

In some embodiments, the translation system 102 has a single instruction multiple data ("SIMD") architecture, and the non-empty at least partially vectorized translation includes SIMD instructions. In some, the target system that will run the vectorized translation has a SIMD architecture. In some cases, the translation system and the target system are the same system, and in other cases, they are different systems.

In some embodiments, and with reference to FIGS. 2 and 3, the non-empty at least partially vectorized translation of the CMMSR loop iterates over sectors of a vector register 302 which has at least four sectors 304. For example, a vector register which holds 128 bits may have four sectors which each hold 32 bits. Another vector register which holds 64 bits may have four sectors which each hold 16 bits. Yet another vector register which holds 256 bits may have eight sectors which each hold 32 bits.

In some embodiments, and with reference to FIGS. 2 and 4, source code 202 includes a CMMSR loop 204 having a form which is consistent with at least one of the following pseudocode templates 400:

CMMSR Loop A Template:

```
1    for (i = lb; i < ub; i++) {
2        if (a[i] > max) {
3            <code including an index expression using i>
4            max = a[i];
5            <may be empty or may include code>
6        }
7    }
```

CMMSR Loop B Template:

```
1       for (i = lb; i < ub; i++) {
2           if (a[i] > max) {
3               <may be empty or may include code>
4               max = a[i];
5               <code including an index expression using i>
6           }
7       }
```

CMMSR Loop C Template:

```
1       for (i = lb; i < ub; i++) {
2           if (a[i] < min) {
3               <code including an index expression using i>
4               min = a[i];
5               <may be empty or may include code>
6           }
7       }
```

CMMSR Loop D Template:

```
1       for (i = lb; i < ub; i++) {
2           if (a[i] < min) {
3               <may be empty or may include code>
4               min = a[i];
5               <code including an index expression using i>
6           }
7       }
```

CMMSR loop AE is loop template A with > replaced by >= in the line 2 extremum test. CMMSR loop BE is loop template B with > replaced by >= in the line 2 extremum test. CMMSR loop CE is loop template C with < replaced by <= in the line 2 extremum test. CMMSR loop DE is loop template D with < replaced by <= in the line 2 extremum test.

In loop templates A, B, C, D, AE, BE, CE, and DE, the equals sign denotes assignment, i denotes a loop index, i++ denotes incrementing i, lb represents a lower bound, ub represents an upper bound, and a[i] represents an individual element at index i in a multi-element variable. In some embodiments, additional code may appear inside the for loop and outside the if statement without departing from the template, provided that said additional code does not access any variable used inside the if statement. No statement appearing at a location indicated in the templates by <code including an index expression using i> or <may be empty or may include code> should have an array access or other multi-element variable access on the left hand side of an assignment. When code is present in a position indicated above by <may be empty or may include code>, that code may include an index expression involving i, or not. Pseudocode line numbers are provided only for reference. The use of a particular syntax is illustrative only and does not restrict any template 400 to a particular programming language or family of programming languages. Templates A, B, AE, and BE are examples of maximum extremum loop templates 402, while templates C, D, CE, and DE are examples of minimum extremum loop templates 404. The labels A, B, C, D, AE, BE, CE, and DE are used here to denote the templates, and to denote loops that match the respective templates.

As yet another example, the following loop does not directly match any of the listed CMMSR templates but qualifies as a CMMSR loop because of its characteristics, which include a loop, a loop index, a loop condition, a loop body, an extremum test ("move_ordering[i]>best" in the if statement), an extremum value ("move_ordering[i]"), an extremum value assignment ("best=move_ordering[i];"), and the presence of index expressions inside the scope of the extremum test even though in this case the index expressions involve a different index than the loop index i:

```
for (i = 0; i < num_moves; i++) {
    if (move_ordering[i] > best) {
        y = c[j]; // note the 'j' rather than loop index 'i'
        best = move_ordering[i];
        z = b[j]; // note the 'j' rather than loop index 'i'
    }
}
```

In some embodiments containing the source code 202, the CMMSR loop in the source code satisfies at least one of the following sets of conditions referenced in the templates 400: (a) the source code corresponding to <code including an index expression using i> includes an assignment of i in the form x=i, and the translator is not configured to insert an assignment of i while performing the source code translation process; (b) the source code corresponding to <code including an index expression using i> does not include an assignment of i in the form x=i, and the <may be empty or may include code> does not include an assignment of i in the form x=i, and the translator is configured to insert an assignment of i in the form x=i while performing the source code translation process.

In some embodiments, with the non-empty at least partially vectorized translation of the CMMSR loop, the non-empty at least partially vectorized translation includes wind-down code 410 which has a form that is consistent with the following pseudocode template 406:

```
1       for (i = lb; i < ub; i++) {
2           if (xtremes[i] op-orig best) {
3               best = xtremes[i];
4               test = indexes[i];
5               result-index = i;
6           } else if (xtremes[i] == best) {
7               if (test op-mapped xtremes[i]) {
8                   test = xtremes[i];
9                   result-index = i;
10              }
11          }
12          <code to assign accumulated value of extremum and assign
                accumulated value of index as results of wind-down code>
```

In this wind-down code template 406, the equals sign denotes assignment, double equals denotes an equality test, i denotes a loop index, i++ denotes incrementing i, lb represents a lower bound, ub represents an upper bound, xtremes[i] represents an individual element at index i in a multi-element variable xtremes, and indexes[i] represents an individual element at index i in a multi-element variable indexes. Also, for the wind-down sequence, lb=0, and ub=number of channels. Pseudocode line numbers are provided only for reference. An example of <code to assign accumulated value of extremum and assign accumulated value of index as results of wind-down code> is given below in paragraph [00253].

The item op-orig denotes an original operator in a test to find an extremum, such as at line 2 of the wind-down code template 406 or line 2 of the extremum loop templates A, B, C, D above. Then the item op-mapped denotes an operator mapped from the original operator 620 as follows: > to >, < to >, >= to <, <= to <.

As with the extremum loop templates, the use of a particular syntax in the wind-down code template is illustrative only and does not restrict the template to a particular programming language or family of programming languages.

As a further illustration, consider a situation in which an assignment z=f(i) occurs in the "if" condition inside the loop at line 2 of the wind-down template above. After the loop, z is still scalar expanded, and hence, wind-down code is required to choose the final value of z. A goal of the wind-down sequence is to find the channel from which result-index is to be picked, which is done via the loop. Once that channel is known, the vectorizer selects z=scalar_expanded_z[channel].

FIG. 5 shows an example of vector lanes 502, vector channels 504, and a results lane 506, with data during an extremum loop execution. In this example, there are four sectors 304 per vector register 302. FIG. 5 is discussed further in an Additional Examples section below.

FIG. 6 shows an example of CMMSR loop characteristics 210, with explanatory text. Items called out in FIG. 6 are also discussed elsewhere herein. Note that the items called out in FIG. 6 are not limited to the specific examples given in that Figure. Thus, a loop index 600 may appear in source code not merely as "i" but alternately as "j" or "idx" or "index" or some other denotation. Similar generalizations apply to the other items called out in FIG. 6.

Methods

Figure 7:
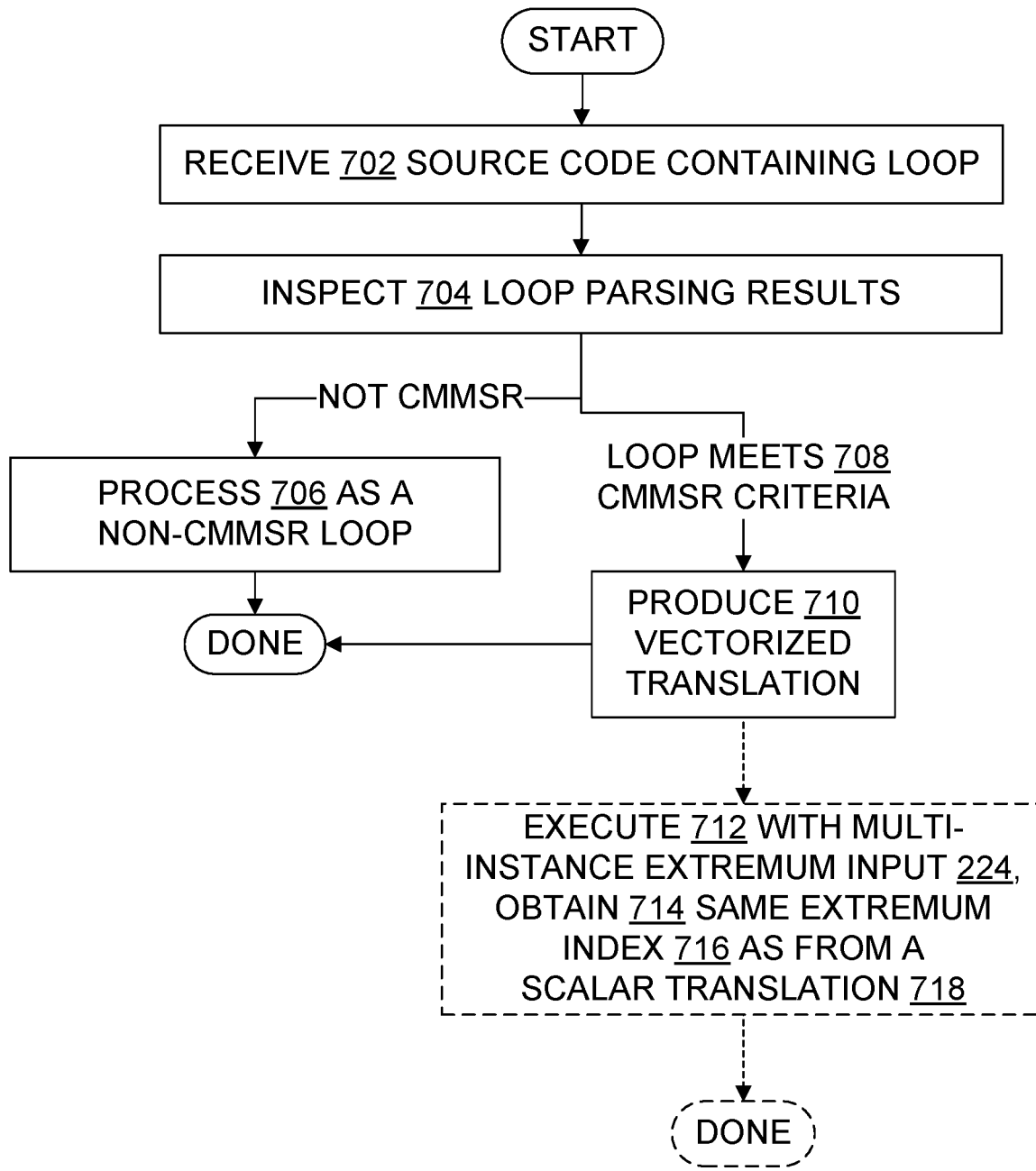
FIG. 7 is a flowchart illustrating a method performed by a translator to identify and vectorize loops.

FIG. 7 illustrates a loop translation (specifically, automatic loop vectorization) method 700 performed automatically by a translator 212. The translator receives 702 source code 202 containing a loop. The translator inspects 704 the loop parsing results 208, which may include the loop source code itself as well as symbol table entries, syntax tree tokens, and other internal compiler/interpreter data. By comparing the parsing results to loop templates and/or a checklist of specified loop characteristics, the inspection 704 determines 808 whether the loop is a CMMSR loop 204. If it is not, then the translator processes 706 the loop using conventional tools and techniques. Note that the loop might still be vectorized by using conventional vectorization. If the loop meets 708 CMMSR processing criteria, meaning it is a CMMSR loop and is legal for vectorization, then the translator uses an implementation of teachings herein to produce 710 a vectorized translation 214. If a vectorization legality check 812 is not expressly mentioned in a particular case, either it is not performed (possible but not recommended for production systems) or the legality check is implicit in the definition of a CMMSR loop (this is the expected situation).

As an illustration, the teachings herein provide correct results for situations in which a naïve vectorization fails to do so. Specifically, an instance of an extremum may appear at two or more locations in a given input. In the input (1, 2, 3, 2, 3, 0) for example, the maximum value 3 appears twice. A CMMSR loop vectorization to calculate the maximum and its index in the input should return "3 and third location from left" if that is what the scalar execution of the CMMSR loop would return, not "3 and fifth location from left". Note that the leftmost occurrence is not always the correct position, because an input may be traversed from right to left (high index to low index) in some cases. With a right to left traversal, the correct result would be "3 and second location from right" (which is equivalent to "3 and fifth location from left") because that is what the scalar execution would return. Thus, as noted in FIG. 7, some embodiments include executing 712 a loop vectorization 214 with a multi-instance extremum input and obtaining 714 the same extremum index 716 as is obtained (or would be obtained 714) from a scalar (i.e., non-vectorized) translation 718 of the loop.

Figure 8:
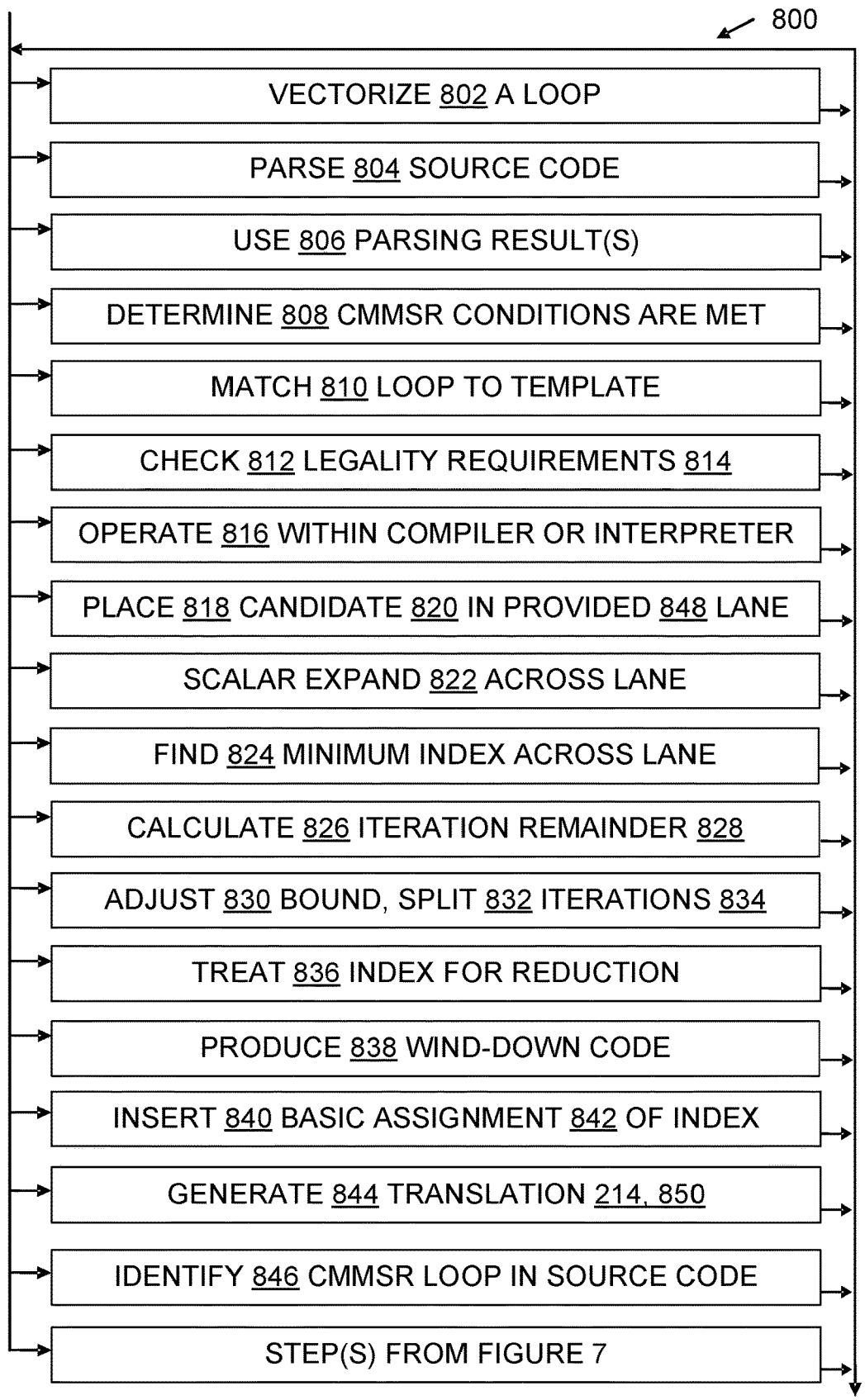
FIG. 8 is a flowchart further illustrating steps in some methods involving automatic loop vectorization.

A flowchart 800 in FIG. 8 illustrates additional vectorization-related steps and incorporates FIG. 7's steps. Technical methods shown in the Figures or otherwise disclosed will be performed automatically, e.g., by a translator 212 in a compiler or interpreter, unless otherwise indicated. Related methods may also be performed in part automatically and in part manually to the extent action by a human administrator or other human person is implicated, e.g., a person may type a command to start a compilation that causes performance of a method consistent with flowchart 800. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIG. 8. Steps may be performed serially, in a partially overlapping manner, or fully in parallel. The order in which flowchart 800 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Some embodiments perform or use or provide a software compilation process performed by a translator 212 (which is a software program executing on computer hardware 102), with the process including the translator receiving 702 a source code which contains a loop, the translator automatically determining 708 that the loop satisfies certain conditions, and the translator automatically producing 710 a non-empty at least partially vectorized translation 214 of the loop. The vectorization includes a vectorization of an extremum index assignment 614 and also includes a vectorization of an extremum value assignment 610. In some embodiments, the specified conditions are the following:

(a) the loop 204 has a loop index 600, a loop condition 602 which refers to the loop index, and a loop body 604,
(b) the loop body has an extremum test 606 for identifying an extremum value 608,
(c) the loop body has an extremum value assignment 610 which is configured to assign the extremum value to an extremum variable 612 when the extremum test is satisfied,
(d) the extremum value assigned is based on the loop index,
(e) the loop body also has an extremum index assignment 614 which is configured to assign a value of an index expression 616 to an extremum index variable 618 when the extremum test is satisfied; and
(f) the index expression is based on the loop index.

In some embodiments, the vectorizations 214 (e.g., extremum value assignment 610 vectorization and extremum index assignment 614 vectorization) include channel 504 data structures in a digital memory 112. Each channel data structure has a respective extremum value and corresponding loop index value. The producing step 710 produces a translation of the loop which includes wind-down code 410 that is configured to perform extremum value assignment and extremum index assignment.

In some of these embodiments, the wind-down code 410 includes a test operation on index values, and the test operation uses an operator that is mapped 408 from an operator in the loop body extremum test 606 by one of the following mappings: a greater-than operator is mapped to itself, a less-than operator is mapped to the greater-than operator, a greater-than-or-equals operator is mapped to the less-than operator, or a less-than-or-equals operator is mapped to the less-than operator.

An extremum is a minimum in some circumstances, and a maximum in other circumstances. With some embodiments that involve a maximum, a computer executes 712 the translation of the loop, including executing the vectorizations, with an input data vector that contains two or more instances of an extremum value designated here as Max that is greater than or equal to every other value in the input data vector. The vectorization is correct, in that it assigns the same value of the index expression to the extremum index variable that is assigned to the extremum index variable by executing an entirely non-vectorized (i.e., scalar) translation of the loop. Similarly, with some embodiments involving a minimum, a computer executes 712 the translation of the loop, including executing the vectorizations, with an input data vector that contains two or more instances of an extremum value designated here as Min that is less than or equal to every other value in the input data vector. This correctly assigns the same value of the index expression to the extremum index variable that is assigned to the extremum index variable by executing an entirely non-vectorized translation of the loop. A given embodiment may include multiple loops, with maximums, minimums, or both being extremums in particular loops of the embodiment.

In embodiments of interest, the extremum test 606 is part of a conditional statement 622 (e.g., an if-statement, if-then statement, if-then-else statement, or functional equivalent constructed with tests and jumps), which has a scope 624 including statements whose execution depends on the result of the tested condition of the conditional statement. The index expression 616 is within the scope of the conditional statement. Sometimes the index expression is merely the index itself (e.g., "i" or "idx" or "j"), but in other cases the index expression 616 includes more than the loop index. In some of the latter cases, when the source code is received 702 there is no assignment of the form <index variable gets loop index> (i.e., basic assignment 842) in the scope of the conditional statement, and the translator automatically inserts 840 an assignment of the form <index variable gets loop index> in the scope of the conditional statement. This basic assignment 842 facilitates vectorization, as discussed further in the Additional Examples section below.

In some embodiments, determining 808 that the loop satisfies the conditions includes using 806 parsing results 208 obtained from parsing 804 the source code 202. In a given case, the parsing results 208 may include, for example, at least one of the following: a parse tree, a syntax tree, an abstract syntax tree, or a symbol table.

In some embodiments, vectorizing 802 a loop 204 by producing 710 a non-empty at least partially vectorized translation 214 of the loop includes the translator 212 generating 844 at least one of the following: an intermediate representation, intermediate language code, assembly language code, object code, p-code, register transfer language code, binary code, or machine code.

Some embodiments use or perform or provide an automatic loop vectorization 802 process performed by a source code translator 2121 for vectorizing a computer program loop. The process includes the source code translator 212 automatically identifying 846 a conditional min-max sequence reduction loop ("CMMSR loop") 204 in a source code 202. The identified loop has characteristics, including at least all of the following CMMSR loop characteristics 210: a loop condition 602, a loop body 604, bounds 626, 628 specifying at least two iterations 834 based on the loop condition and the loop body, an extremum test 606 configured to identify an extremum value 608 of a multi-element 630 input 224, and an extremum index variable 618 which receives an index expression 616 value when the extremum test is satisfied. The identification 846 is accomplished by the source code translator automatically locating the specified CMMSR loop characteristics in one or more parsing results 208 which are results of parsing 804 the source code.

The method in question also includes providing 848 in a digital memory 112 a respective vector lane 502 for each of at least two iterations of the CMMSR loop, and producing 710 a non-empty at least partially vectorized translation 214 of the CMMSR loop. The vectorized translation is configured to upon execution (a) place 818 in each sector 304 of a vector lane 502 a candidate extremum value 820 which is a candidate for an extremum value across the multi-element input, (b) scalar expand 822 the extremum index variable across the vector lane sectors so that each vector lane sector has a respective index expression value corresponding to the candidate extremum value of that vector lane sector, and (c) find 824 a minimum value of the index expression values in one or more vector lane sectors for which that vector lane sector's candidate extremum value is an extremum across multiple candidate extremum values.

In some embodiments, the non-empty at least partially vectorized translation of the CMMSR loop targets an n-element processor architecture that is configured to process n elements in parallel (e.g., using n sectors 304), wherein the number of iterations 834 of the loop in the identified source code is n*k+r where n and k and r are positive integers. Then the process further includes (a) adjusting 830 at least one bound of the loop to make the number of iterations of the loop be n*k for the providing and producing steps, and (b) further producing 844 a non-vectorized translation 850 of the CMMSR loop for the remaining r iterations.

In some embodiments, the translation process treats 836 an index variable in the index expression value as a secondary reduction candidate, while some embodiments treat 836 an index variable in the index expression value as a primary reduction candidate. Some embodiments distinguish between a "primary reduction candidate" or "primary reduction variable", which meets criteria familiar in the art for a reduction variable, and a "secondary reduction candidate" or "secondary reduction variable", which depends on a primary reduction variable in the sense that whichever vector value is chosen for the primary variable, the secondary variable depending on that primary variable must be chosen from the same iteration.

In some embodiments, the translation process produces 838 wind-down code which is configured upon execution to compute the extremum across all vector lane candidate extremum values.

In some embodiments, the number of vector lane sectors 304 is a multiple of two greater than or equal to four. In some, the number of vector lane sectors 304 is a multiple of two greater than or equal to eight.

In some embodiments, the translation process includes checking 812 at least one vectorization legality requirement 814 prior to producing 710 the non-empty at least partially vectorized translation of the CMMSR loop. Some examples of legality requirements 814 include data dependencies that span more iterations than can be parallelized due to the limited number of vector sectors, and examples provided in the Additional Examples section below.

Configured Media

Some embodiments include a configured computer-readable storage medium 112. Medium 112 may include disks (magnetic, optical, or otherwise), RAM, EEPROMS or other ROMs, and/or other configurable digital memory, including in particular computer-readable media (which are not mere propagated signals). The storage medium which is configured may be in particular a removable storage medium 114 such as a CD, DVD, or flash memory. A general-purpose digital memory, which may be removable or not, and may be volatile or not, can be configured into an embodiment using items such as source code 202, parse results 208, CMMSR loop characteristics 210 and items 600-630, translator 212, input 224, and vectorized translation 214, in the form of data 118 and instructions 116, read from a removable medium 114 and/or another source such as a network connection, to form a configured medium. The configured medium 112 is capable of causing a computer system to perform technical process steps for creating or using command line parsers as disclosed herein. The Figures thus help illustrate configured storage media embodiments and process embodiments, as well as system and process embodiments. In particular, any of the process steps illustrated in FIG. 2, 7, or 8, or otherwise taught herein, may be used to help configure a storage medium to form a configured medium embodiment.

Additional Examples

As to conditional min-max sequence reductions to vectorize loops, teaching herein identify a new class of loops to vectorize. The name used herein for that class is "conditional min-max sequence reduction loops" or "CMMSR loops" but one of skill will recognize such loops based on their characteristics or compliance with templates provided herein regardless of what name is used to label the loops.

Another example defining CMMSR loops is:

```
for (i = lb; i < ub; i++) {
    if (a[i] > max) {
        <non_reduction_scalar_expandable_code>
        max = a[i];
        maxindex = i;
        <non_reduction_scalar_expandable_code (potentially using i)>
    }
}
```

An important aspect of this example is that the index of the maximum element is being used in the conditional code. This distinguishes CMMSR loops from familiar min-max loops that can be vectorized using familiar techniques, such as this non-CMMSR loop:

```
for (i = lb; i < ub; i++) {
    if (a[i] > max) {
        <non_reduction_scalar_expandable_code>
        max = a[i];
        <non_reduction_scalar_expandable_code>
    }
}
```

Code that eventually helped lead the inventors to a realization of the significance of CMMSR loops includes code in SPEC CPU2006 and SPEC 2017 Deepsjeng benchmarks. However, the loop examples there are not labeled as CMMSR loops. Benchmark documentation is on the website of the Standard Performance Evaluation Corporation (SPEC) at www dot spec dot org. The SPEC website is identified here solely as background information. The website address is not intended to operate as a live hyperlink, and there is no intention to incorporate by reference any information into the present disclosure document.

As to min-max reductions generally, consider the following loop:

```
for (i = 0; i < num_moves; i++) {
    if (move_ordering[i] > best) {
        best = move_ordering[i];
    }
}
```

At least one compiler limited to familiar techniques would only vectorize such loops under vector min-max pattern recognition. If that option is turned off, no attempt it made to vectorize this loop and similar loops.

Assuming vector min-max pattern recognition is turned on, however, familiar techniques can be used to vectorize such min-max reductions. Consider a vector of width four (i.e., four vector sectors 304 per lane 502). Each sector will hold a value for a given iteration. Sector 0 will load move_ordering[0] of what would be scalar iteration one, sector 1 will load move_ordering[1] of what would be scalar iteration two, and so on. Sectors correspond to channels 504. A compiler vectorizes such loops by reducing privately in each vector channel using pmax/pmin instructions. Initially, each channel would start off with its own copy of 'best'. After the loop finishes, the code would be left with four copies of 'best', corresponding to each channel, from which to select the maximum element.

Selection of the maximum element is achieved through generation of correct wind-down code 410. In a particular implementation, the translator emits IV_VECT_REDUCE_MAX which chooses the maximum element among the four channels. A vector intrinsic translation mechanism has machinery to generate code that iterates over each sector of an xmm vector register 302 to find the maximum. Similar operations are performed with other translations and other vector processors.

Now consider an example of the conditional min-max sequence reduction. A Deepsjeng benchmark hotspot loop looks like this:

```
for (i = 0; i < num_moves; i++) {
    if (move_ordering[i] > best) {
        best = move_ordering[i];
        test = i;
    }
}
```

<some use of test, and some use of best>

The <some use of test, and some use of best> code is noteworthy because if the results of the loop are never used after the loop, then the most efficient optimization is to generate no code for the loop. That special case holds little interest, but does lead to claim language expressly noting that the vectorization is non-empty, which might otherwise not be understood. In general, examples and claims herein presume that use of the loop results is made or that the loop must be performed for some other reason, even if that is not expressly stated each and every time.

In this example loop, not only is the maximum element (best) being found, but in contrast to a simpler min-max loop above, the index of this maximum element in the move_o- rdering array is captured and used afterwards. This example differs from familiar min/max reductions already performed in compilers. Whereas a conventional compiler can compute the maximum element in the vector using pmax/pmin instructions, it is not possible to thus compute the array index corresponding to the maximum element.

The array index in this example is representative of what is termed herein a "secondary" reduction variable. In some embodiments, a reduction variable accumulates data from one iteration to the next. It always has some initialization, and while the data accumulated can be different in each iteration, the operator remains the same. More formally, a "reduction variable" X is a variable used inside a loop whose value after execution of the loop depends on the values given to X by iterations of the loop, but does not depend on the order in which those iterations occur. A "secondary reduction variable" is a variable used inside a loop whose value after execution of the loop depends at least in part on one or more other reduction variables. "Secondary reduction variable" is a label created for use in this patent application. When a secondary reduction variable is involved, for clarity the reduction variable that the secondary reduction variable depends on is called a "primary reduction variable". These secondary reduction variables depend upon the primary reduction variable in the sense that whichever vector channel the primary variable is picked from, that primary's secondary variables will be picked from the same channel to generate the final result.

Consider the following example, which is illustrated in FIG. 5 and below. Assume move_ordering contains {0, 1, 4, 7, 7, 1, 2, 3}, i.e. there are eight integer elements in the array so there will be eight iterations. With 128-bit vector registers 302 having 32-bit sectors, one has four channels per lane, so there are two iterations. The comparison would be along the vertical channels below
Result:

| 0 | 1 | 4 | 7 |
|---|---|---|---|
| 7 | 1 | 2 | 3 |
| 7 | 1 | 4 | 7 |

Now, if the translation code selects the element in the first channel as the maximum (note that 7 is also present in the last channel), then the index provided as the result will be 4, which corresponds to the second instance of the max value 7 as the array is traversed from left to right with indexes running from 0 to 7. But, in the scalar version of the loop, the result index would be 3, because the 7 at index 4 is not greater than the 7 at index 3 in the test "if (move_ordering [i]>best)", so the 7 at index 3 remains the max and index 3 is the correct result. This example shows that wind-down code must be carefully designed to decide the correct channel to select the maximum index from.

In this context, consider a more general case for conditional min-max sequence reductions. Consider the following general case example:

```
for (i = lb; i < ub; i++) {
    if (a[i] > max) {
        <non_reduction_scalar_expandable_code possibly referencing i>
        max = a[i];
        <non_reduction_scalar_expandable_code possibly referencing i>
    }
}
```

In this example, <non_reduction_scalar_expandable_code> indicates parallelizable code in a vectorizable loop. For instance, "a[i]=b[i]*b[i];" is <non_reduction_scalar_expandable_code> in the following loop:

```
for(i=0; i<10000; i++) {
    a[i] = b[i]*b[i];
}
```

Scalar expansion is only required if the left hand side (LHS) is a scalar, e.g., "d=b[i]*b[i]".

By contrast, <non_reduction_scalar_expandable_code possibly referencing i> can be any statement or statements that depend on one or more loop indexes, and "possibly referencing i" means that one or the other or both of the occurrences reference index i. The phrase "referencing i" indicates that the index of the maximum does not need to be captured per se. As to non-reduction-scalar-expandable code, in an extremum index assignment 614 the assignment has the general form LHS=RHS, where LHS is a scalar, the operator is assignment (denoted here by =), and RHS is an expression that is vectorizable, i.e., free of disqualifying data dependence and otherwise legal. Each of the following is an extremum index assignment: "a=b[i]", "a=i*i", and "a=f(i)" where f is vectorizable. Here, as elsewhere, semicolons between statements may be provided but their presence or absence is not meant to be substantive.

In this general case example, assume four vector channels can compute in parallel four candidates for indexes of the array a. In such situations, whenever the reduction is inside a conditional code block, and there is additional non-reduction code, a conventional compiler does not vectorize such loops. One reason is that the non-reduction statements cannot be expressed with the available vector instructions.

But as taught herein, such CMMSR loops can be correctly vectorized. Each vector channel computes its own "max". The variable "test" is scalar expanded 822, and each vector channel, after the vector loop finishes, will have its own "test" corresponding to its own "max". Finally, the translation code reduces across the vector channels. To get the correct index into "test", it finds the minimum value of the index in the vector channels (assuming array traversal from low index to high index; for traversal from high index to low index, find the maximum index), for which the max elements were found (this applies only if there are multiple instances of the extremum). As elsewhere herein, although arrays are used as examples the teachings presented also apply to other multi-element variables such as lists, tuples, trees, graphs, concatenations, sets, collections, and so on, which have a traversal mechanism designating individual elements by index. Also, the cause for finding the lowest (or highest) index is not necessarily the traversal direction alone, but may also include the comparison operator used in the extremum test in the original loop while seeking the extremum. Although less-than (designated, e.g., "<" or "lt") and greater-than (designated, e.g., ">" or "gt") are used in many examples herein, other comparison operators the translator may encounter in extremum tests include greater-than-or-equals (designated, e.g., ">=" or "gte" or "ge") and less-than-or-equals (designated, e.g., "<=" or "lte" or "le"). For instance, in the following loop the last index would be returned, despite the traversal direction being from low index toward high index:

```
for (i = 0; i < num_moves; i++) {
    if (move_ordering[i] >= best) {
        best = move_ordering[i];
        test = i;
    }
}
```

As another example, consider loops which do not directly access the index by a basic assignment but instead access the index values through a more complex expression. For instance:

```
for (i = 0; i < num_moves; i++) {
    if (move_ordering[i] > best) {
        best = move_ordering[i];
        test = i*i;
    }
}
``` some use of test, and some use of best . . . .

In such cases, the vectorization inserts 840 a dummy assignment "dummy=i" as a basic assignment 842 before "test=i*i". Then, with the approach defined above, the code will first find the reduced value of "i", and also collect the channel number it belonged to. Then, for rest of the assignments involving an index, such as "test=i*i", the translation will grab the value from that selected channel. Details of this approach can be found in an implementation example later in this disclosure. The insertion 840 may insert a basic assignment in the actual source 202, may insert 840 into an intermediate representation, or may insert 840 into an abstract syntax tree, for example. While such code insertion could in theory be done in any phase of the compilation, one favored approach inserts 840 a basic assignment in the intermediate representation, because much of the rest of the vectorizer 212 works on that intermediate representation.

As an example of intermediate representation, the following is provided. This example corresponds to the example in paragraph [00244] involving extremum test "(move_ordering[i]>=best)". This example uses Microsoft Visual C++ compiler backend intermediate representation, but one of skill will recognize that the teachings herein can be applied in other compilers, with other programming languages, and other intermediate representations using various opcodes. This example shows intermediate representation code after bitmasked moves (shown below implemented with bitMaskedMove( ) operations into xmm registers, and sometimes known as byte-masked moves) are performed:

Intermediate representation code example:

```
BLOCK 9 In(8) Out(20)
r i$.i32<*46> = OPDOLOOP.vd [0] DO i$.i32<*38> = 0(0x0).i32 LT tv132.i32 BY 4(0x4).i32 type:i32
                             (0|4=N)  #21
>>> Begin landing pad
BLOCK 10:V:L In(22) Out(11)
    t130.i32  = OPREM.i32 tv128.i32, tv129.i32    (4|4=4,4)   #16
    t131.i32  = OPMUL.i32 t130.i32, 1(0x1).i32    (4|4=4,4)   #16
    tv132.i32 = OPSUB.i32 num_moves$.i32.a64<3>, t131.i32 (4|4=4,4)  #16
BLOCK
<<< End landing pad
>>> Begin loop body
BLOCK 11 In(18,10) Out(12) DoLoop:0
r$LL4@remove_one:                                ; uses = 0 [LOOP]
BLOCK 12:V In(11) Out(13) DoLoop:0
    best$.i32<*36> = OPPHI.i32 best$.i32<9>, best$.i32<23>  (4|4=4,4)
    test$.i32<*37> = OPPHI.i32 test$.i32<11>, test$.i32<24>  (4|4=4,4)
BLOCK 13:V In(12) Out(14) DoLoop:0
r t66.i64<*14> = OPCONVERT.i64 i$.i32<38>        (8|8=4)    #23
r t67.i64<*15> = OPMUL.i64 t66!.i64<14>, 4(0x4)$$.i64    (8|8=8,8)  #23
r t68.i64<*16> = OPADD.i64 t67!.i64<15>, move_ordering$.i64<2> (8|8=8,8) #23
    t80.i32<*17> = OPLOAD.i32 [t68!.i64<16>]$.i32    (4|4=4,8)   #23
r tv135.i32<*47> = OPVECTCMPGT.i32 t80!.i32<17>, best$.i32<36>  (4|4=4,4)
#23
BLOCK 14:V In(13) Out(15) DoLoop:0
r t70.i64<*19> = OPCONVERT.i64 i$.i32<38>        (8|8=4)    #25
r t71.i64<*20> = OPMUL.i64 t70!.i64<19>, 4(0x4)$$.i64    (8|8=8,8)  #25
r t72.i64<*21> = OPADD.i64 t71!.i64<20>, move_ordering$.i64<2> (8|8=8,8) #25
    t81.i32<*22> = OPLOAD.i32 [t72!.i64<21>]$[dL].i32    (4|4=4,8)   #25
    t138.i32<*49> = OPVECTBAND.i32 t81.i32<22>, tv135.i32<47> (4|4=4,4) #16
    t140.i32<*50> = OPVECTBANDNOT.i32 tv135.i32<47>, best$.i32<36>
(4|4=4,4) #16
    t142.i32<*51> = OPVECTBOR.i32 t138.i32<49>, t140.i32<50>  (4|4=4,4)  #16
r best$.i32<*23> = OPASSIGN.i32 t142.i32<51>        (4|4=4)   #25
BLOCK 15:V In(14) Out(16) DoLoop:0
    t144.i32<*52> = OPVECTBAND.i32 i$.i32<38>, tv135.i32<47> (4|4=4,4)  #16
    t146.i32<*53> = OPVECTBANDNOT.i32 tv135.i32<47>, test$.i32<37>  (4|4=4,4)
#16
    t148.i32<*54> = OPVECTBOR.i32 t144.i32<52>, t146.i32<53>  (4|4=4,4)  #16
r test$.i32<*24> = OPASSIGN.i32 t148.i32<54>        (4|4=4)   #26
BLOCK 16 In(15) Out(17) DoLoop:0
r$LN2@remove_one:                                ; uses = 0
BLOCK 17:V In(16) Out(18) DoLoop:0
BLOCK 18 In(17) Out(19,11) DoLoop:0
BLOCK
<<< End loop body
```

With regard to implementation of a CMMSR loop vectorizer, a function may be created to recognize such loops as valid reduction cases, analogous to the existing method VECT_RecognizeReduction, for instance. VECT_RecognizeReduction is an example from a Microsoft Visual C++ context; more generally, the vectorizer finds reduction patterns in a given loop. The implementation will check 812 for the legality of such patterns. The implementation will generate 844 scalar reduction code using, e.g., a VECT_GenerateScalarReductionCode function or other mechanism to generate scalar reduction code. For the conditional reduction, an analogous function VECT_GenerateScalarConditionalReductionCode will be created. One difference in this sort of reduction is that the vectorization doesn't merely reduce over a single statement, but all the statements in the IF condition block are being reduced. This means that while generating the wind-down code, the vectorizer will account for multi-statement scenarios, which a conventional approach does not do. For each assignment in the condition block, the vectorizer will potentially have to perform scalar expansion. As a limited implementation, a vectorizer may be written to only vectorize if the assignment is to a scalar. In the particular example at hand, the expanded scalar must fit in the xmm register. The implementation will include new vector instrinsics, and corresponding codegen for the wind-down code.

In this context, a loop given above will look something like this after vectorization:

```
Xmm1 = [best, best, best, best]
Xmm4 = [test, test, test, test]
    for (i = 0; i < num_moves; i += 4) {
        xmm2 = vectorLoad ( [ move_ordering[i], move_ordering[i+1], move_ordering[i+2], move_ordering[i+3] ])
        xmm3 = vectorcmp [xmm2 > xmm1]
        xmm4 = bitMaskedMove(xmm3, [i, i+1, i+2, i+3])
        xmm1 = bitMaskedMove(xmm3, xmm2)
    }
```

Wind-down code generation presents challenges in such vectorization. Consider an example wind-down code 410 below:

```
//wind down code
best = xmm1[0] // this means the first integer of the packed xmm1 register
test = xmm4[0]
for (i=1; i<4; i++) { // 4 is the number of sectors (a.k.a. channels) in this example
    if (xmm1[i] > best) {
        test = xmm4[i];
        best = xmm1[i];
    }
}
```

In this example, although the maximum will get calculated correctly, the "test" variable might not be. This error would occur in cases where more than one element of move_ordering array has the maximum value. In the scalar code, the first maximum will be picked; however, for the vector code above, there's no such guarantee.

To deal with this issue, a vectorizer may treat the array index variable as a secondary reduction candidate. Accordingly, the vectorizer will create 840 a statement x=i inside the conditional region (in the specific case at hand, there is already such a statement, so there's no need to create another). The wind-down code will have this logic:

```
best = xmm1[0]
test = xmm4[0]
indexNum = 0
for (i=1; i<4; i++) { // 4 sectors per register in this example
    if (xmm1[i] op-orig best) { // in this instance, op-orig is >
        best = xmm1[i];
        test = xmm4[i];
        indexNum = i;
    } else if (xmm1[i] == best) { // in this instance, op-mapped is >
        if (test op-mapped xmm4[i])
            test = xmm4[i]
            indexNum = i;
    }
}
// no other assignments in this example because dummy insertion 840 was
not needed, but in general there may be; code such as the conditioned
assignments below will typically be part of the total code used for winding
down, even though to preserve space it is not repeated in every example
herein
if (test != INITIAL_VALUE_OF_TEST) { // return accumulated value
of extremum and index
    Assignment[0] = accumulated_value[indexNum]; //accumulated value
is in an xmm register
    Assignment[1] = accumulated_value[indexNum];
    .
    .
}
```

The op-orig operator is the same as in the original comparison, that is, the extremum test 606. The op-mapped operator is based on the op-orig operator as follows, where the mapping is shows the original comparator operator → to be used comparator operator:

>→>
<→>
>=→><
<=→><

As to the legality requirements, one check 812 proceeds as follows. The vectorizer 212 starts with a bitmasked comparison instruction (denote here VectCmpOfInterest). Then it finds the join block of this instruction (joiner). This is also known as the operation of finding an IPDOM (immediate post-dominator). Next the vectorizer ensures that at least one of the operands to the comparison is a scalar symbol (redVar), e.g., a scalar variable. Non-scalar symbols are aggregate symbols, such as arrays and structs. Next the vectorizer iterates on all instructions between VectCmpOfInterest and joiner and ensures the following:

(a) One of the instructions is an assignment to the redVar, and the value assigned is what was being compared. This hints the presence of min/max.
(b) There are no accesses to redVar in the loop. This is a usual reduction requirement.
(c) For each assignment, there is a corresponding PHI instruction in the loop header block. This is also a usual reduction requirement.
(d) There is no operation that is not vectorizable based on familiar vectorization legality criteria. If there is, the vectorizer will end the vectorization attempt.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Claim Perspectives

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 7 and 8 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A software compilation process performed by a translator which is a software program executing on computer hardware, the process comprising:
   the translator receiving a source code which contains a loop;
   the translator automatically determining that the loop satisfies the following conditions:
   (a) the loop has a loop index, a loop condition which refers to the loop index, and a loop body,
   (b) the loop body has an extremum test for identifying an extremum value,
   (c) the loop body has an extremum value assignment which is configured to assign the extremum value to an extremum variable when the extremum test is satisfied,
   (d) the extremum value assigned is based on the loop index,
   (e) the loop body also has an extremum index assignment which is configured to assign a value of an index expression to an extremum index variable when the extremum test is satisfied; and
   (f) the index expression is based on the loop index; and
   the translator automatically producing a non-empty at least partially vectorized translation of the loop which includes a vectorization of the extremum index assignment and also includes a vectorization of the extremum value assignment, wherein the vectorizations comprise channel data structures in a digital memory, each channel data structure has a respective extremum value and corresponding loop index value, and the producing produces a translation of the loop which comprises wind-down code that is configured to perform extremum value assignment and extremum index assignment at least in part by gathering across the channel data structures one or more candidates for the extremum value and one or more corresponding candidates for the loop index value.

2. The software compilation process of claim 1, wherein the index expression includes the loop index and is not identical with the loop index.

3. The software compilation process of claim 2, wherein the wind-down code includes a test operation on index values, and the test operation uses an operator that is mapped from an operator in the extremum test by one of the following mappings: a greater-than operator is mapped to itself, a less-than operator is mapped to the greater-than operator, a greater-than-or-equals operator is mapped to the less-than operator, or a less-than-or-equals operator is mapped to the less-than operator.

4. The software compilation process of claim 1, further comprising at least one of the following: a computer executing the translation of the loop, including executing the vectorizations, with an input data vector that contains two or more instances of an extremum value designated here as Max that is greater than or equal to every other value in the input data vector, thereby assigning a same value of the index expression to the extremum index variable that is assigned to the extremum index variable by executing an entirely non-vectorized translation of the loop; or a computer executing the translation of the loop, including executing the vectorizations, with an input data vector that contains two or more instances of an extremum value designated here as Min that is less than or equal to every other value in the input data vector, thereby assigning the same value of the index expression to the extremum index variable that is assigned to the extremum index variable by executing an entirely non-vectorized translation of the loop.

5. The software compilation process of claim 1, wherein the extremum test is part of a conditional statement which has a scope, the index expression is within the scope of the conditional statement and includes the loop index and is not identical with the loop index, when the source code is received there is no assignment of a form <index variable gets loop index> in the scope of the conditional statement, and the compilation process further comprises the translator automatically inserting an assignment of the form <index variable gets loop index> in the scope of the conditional statement.

6. The software compilation process of claim 1, wherein determining that the loop satisfies the conditions comprises using parsing results obtained from parsing the source code, the parsing results comprising at least one of the following: a parse tree, a syntax tree, an abstract syntax tree, or a symbol table.

7. The software compilation process of claim 1, wherein producing a non-empty at least partially vectorized translation of the loop comprises the translator generating at least one of the following: an intermediate representation, intermediate language code, assembly language code, object code, p-code, register transfer language code, binary code, or machine code.

8. A source code translation system comprising:
at least one processor;
a digital memory in operable communication with the processor;
a translator, residing in the digital memory, and which upon execution by the processor performs a source code translation process that includes identifying a conditional min-max sequence reduction loop ("CMMSR loop") in a source code and producing a non-empty at least partially vectorized translation of the CMMSR loop, wherein the vectorized translation includes channel data structures in the digital memory, each channel data structure having a respective extremum value and corresponding loop index value, and wherein the vectorized translation includes wind-down code that is configured to perform extremum value assignment and extremum index assignment at least in part by gathering across the channel data structures one or more candidates for the extremum value and one or more corresponding candidates for the loop index value, and wherein the system is configured to perform extremum index assignment for a multi-instance extremum input using an input traversal direction which obtains a same extremum index as a scalar translation of the CMMSR loop.

9. The source code translation system of claim 8, wherein the translator operates within at least one of the following: an ahead-of-time compiler, a just-in-time compiler, or an interpreter.

10. The source code translation system of claim 8, wherein the system has a single instruction multiple data ("SIMD") architecture, and the non-empty at least partially vectorized translation includes SIMD instructions.

11. The source code translation system of claim 8, wherein the non-empty at least partially vectorized translation of the CMMSR loop iterates over sectors of a vector register which has at least four sectors.

12. The source code translation system of claim 8, further comprising source code which includes a CMMSR loop having a form which is consistent with at least one of the following pseudocode templates:
CMMSR loop A templates:

```
1    for (i = lb; i < ub; i++) {
2        if (a[i] > max) {
3            <code including an index expression using i>
4            max = a[i];
5            <additional code>
6        }
7    }
1    for (i = lb; i < ub; i++) {
2        if (a[i] > max) {
3            <code including an index expression using i>
4            max = a[i];
5        }
6    }
```

CMMSR loop B templates:

```
1    for (i = lb; i < ub; i++) {
2        if (a[i] > max) {
3            <additional code>
4            max = a[i];
5            <code including an index expression using i>
6        }
7    }
1    for (i = lb; i < ub; i++) {
2        if (a[i] > max) {
3            max = a[i];
4            <code including an index expression using i>
```

```
5       }
6   }
```

CMMSR loop C templates:

```
1   for (i = lb; i < ub; i++) {
2       if (a[i] < min) {
3           <code including an index expression using i>
4           min = a[i];
5           <additional code>
6       }
7   }
1   for (i = lb; i < ub; i++) {
2       if (a[i] < min) {
3           <code including an index expression using i>
4           min = a[i];
5       }
6   }
```

CMMSR loop D templates:

```
1   for (i = lb; i < ub; i++) {
2       if (a[i] < min) {
3           <additional code>
4           min = a[i];
5           <code including an index expression using i>
6       }
7   }
1   for (i = lb; i < ub; i++) {
2       if (a[i] < min) {
3           min = a[i];
4           <code including an index expression using i>
5       }
6   }
``` in which the equals sign denotes assignment, i denotes a loop index, i++ denotes incrementing i, lb represents a lower bound, ub represents an upper bound, a[i] represents an individual element at index i in a multi-element variable, pseudocode line numbers are provided only for reference, additional code may appear inside the for loop and outside the if statement provided that said additional code does not access any variable which is used inside the if statement, code present in a position indicated by <additional code> may include an index expression involving i or may not, additional templates AE, BE, CE, and DE are present in which the line 2 extremum test comparison operators allow equality, namely, less-than is replaced by less-than-or-equals in templates C and D to form templates CE and DE, and greater-than is replaced by greater-than-or-equals in templates A and B to form templates AE and BE, and the use of a particular syntax is illustrative only and does not restrict any template to a particular programming language or family of programming languages.

13. The source code translation system of claim 12, wherein the system comprises the source code, and the CMMSR loop in the source code satisfies at least one of the following sets of conditions: (a) the source code corresponding to <code including an index expression using i> includes an assignment of i in a form x=i, and the translator is not configured to insert an assignment of i while performing the source code translation process; (b) the source code corresponding to <code including an index expression using i> does not include an assignment of i in the form x=i, and the <additional code> does not include an assignment of i in the form x=i, and the translator is configured to insert an assignment of i in the form x=i while performing the source code translation process.

14. The source code translation system of claim 8, further comprising the non-empty at least partially vectorized translation of the CMMSR loop, wherein the non-empty at least partially vectorized translation comprises wind-down code which has a form that is consistent with the following pseudocode template:

```
1   for (i = lb; i < ub; i++) {
2       if (xtremes[i] op-orig best) {
3           best = xtremes[i];
4           test = indexes[i];
5           result-index = i;
6       } else if (xtremes[i] == best) {
7           if (test op-mapped xtremes[i]) {
8               test = xtremes[i];
9               result-index = i;
10          }
11      }
12      <code to assign accumulated value of extremum and assign
        accumulated value of index as results of wind-down code>
``` in which the equals sign denotes assignment, double equals denotes an equality test, i denotes a loop index, i++ denotes incrementing i, lb represents a lower bound, ub represents an upper bound, xtremes[i] represents an individual element at index i in a multi-element variable xtremes, indexes[i] represents an individual element at index i in a multi-element variable indexes, pseudocode line numbers are provided only for reference, op-orig denotes an original operator in a test to find an extremum, op-mapped denotes an operator mapped from the original operator as follows: > to >, < to >, >= to <, <= to <, and the use of a particular syntax is illustrative only and does not restrict the template to a particular programming language or family of programming languages.

15. A process performed by a source code translator for vectorizing a computer program loop, the process comprising the source code translator automatically:
identifying a conditional min-max sequence reduction loop ("CMMSR loop") in a source code, the CMMSR loop having at least all of the following CMMSR loop characteristics: a loop condition, a loop body, bounds specifying at least two iterations based on the loop condition and the loop body, an extremum test configured to identify an extremum value of a multi-element input, and an extremum index variable which receives an index expression value when the extremum test is satisfied, said identifying being accomplished by the source code translator automatically locating said CMMSR loop characteristics in one or more parsing results which are results of parsing the source code;
providing in a digital memory a respective vector lane for each of at least two iterations of the CMMSR loop; and
producing a non-empty at least partially vectorized translation of the CMMSR loop which is configured to upon execution (a) place in each sector of a vector lane a candidate extremum value which is a candidate for an extremum value across the multi-element input, (b) scalar expand the extremum index variable across the vector lane sectors so that each vector lane sector has a respective index expression value corresponding to the candidate extremum value of that vector lane sector, and (c) find a minimum value of the index expression values in one or more vector lane sectors for which that vector lane sector's candidate extremum value is an extremum across multiple candidate extremum values.

16. The process of claim 15, wherein the non-empty at least partially vectorized translation of the CMMSR loop targets an n-element processor architecture that is configured to process n elements in parallel, wherein a number of iterations of the loop in the identified source code is n*k+r where n and k and r are positive integers, and wherein the process further comprises (a) adjusting at least one bound of the loop to make the number of iterations of the loop be n*k for the providing and producing steps, and (b) further producing a non-vectorized translation of the CMMSR loop for the remaining r iterations.

17. The process of claim 15, wherein the process treats an index variable in the index expression value as a secondary reduction candidate.

18. The process of claim 15, wherein the process produces wind-down code which is configured upon execution to compute the extremum across all vector lane candidate extremum values.

19. The process of claim 15, wherein a number of vector lane sectors is a multiple of two greater than or equal to four.

20. The process of claim 15, wherein the process further comprises checking at least one vectorization legality requirement prior to producing the non-empty at least partially vectorized translation of the CMMSR loop.

* * * * *